(12) United States Patent
Drane

(10) Patent No.: US 10,331,405 B2
(45) Date of Patent: Jun. 25, 2019

(54) EVALUATING POLYNOMIALS IN HARDWARE LOGIC

(71) Applicant: Imagination Technologies Limited, Kings Langley (GB)

(72) Inventor: Theo Alan Drane, London (GB)

(73) Assignee: Imagination Technologies Limited, Kings Langley (GB)

( * ) Notice: Subject to any disclaimer, the term of this patent is extended or adjusted under 35 U.S.C. 154(b) by 30 days.

(21) Appl. No.: 15/493,340

(22) Filed: Apr. 21, 2017

(65) Prior Publication Data

US 2017/0308355 A1   Oct. 26, 2017

(30) Foreign Application Priority Data

Apr. 22, 2016  (GB) .................................. 1607075.7

(51) Int. Cl.
*G06F 17/11* (2006.01)
*G06F 7/483* (2006.01)
*G06F 7/552* (2006.01)

(52) U.S. Cl.
CPC ............. *G06F 7/483* (2013.01); *G06F 7/552* (2013.01); *G06F 17/11* (2013.01); *G06F 2207/5523* (2013.01)

(58) Field of Classification Search
None
See application file for complete search history.

(56) References Cited

U.S. PATENT DOCUMENTS 5,463,574 A * 10/1995 Desrosiers .............. G06F 7/556
 708/495
5,646,876 A  7/1997 Smith 8,332,446 B1 * 12/2012 Everest ................... G06F 7/544
 708/203
8,949,298 B1 *  2/2015 Langhammer .......... G06F 7/552
 708/200
2012/0130659 A1 *  5/2012 Chaves ................... H03M 7/30
 702/62

FOREIGN PATENT DOCUMENTS

GB          2527859 A       1/2016

OTHER PUBLICATIONS

J. Demmel et al.,"Toward accurate polynomial evaluation in rounded arithmetic," arXiv:math/0508350v2, Jan. 18, 2006.
T. Drane, "Lossy Polynomial Datapath Synthesis," PhD Thesis, Imperial College, London, Feb. 2014.
James Demmel et al; "Accurate and Efficient Expression Evaluation and Linear Algebra"; Acta Numerica, pp. 1-59, available at http://math.mit.edu/-plamen/files/acta.pdf; Feb. 2, 2008; 49 pages.

* cited by examiner

*Primary Examiner* — Michael D. Yaary
(74) *Attorney, Agent, or Firm* — Vorys, Sater, Seymour and Pease LLP; Vincent M DeLuca

(57) ABSTRACT

An accurate implementation of a polynomial using floating-point or other rounded arithmetic can be generated using a plurality of hardware logic components which each implement an input polynomial such that the zeros in the input polynomial can be determined correctly. The number of different hardware logic components that are used can be reduced by analyzing the set of input polynomials and from it generating a set of polynomial components, where each polynomial in the set of input polynomials which is not also in the set of polynomial components, can be generated from a single one of the polynomial components.

20 Claims, 6 Drawing Sheets

EVALUATING POLYNOMIALS IN HARDWARE LOGIC

BACKGROUND

As is known to those of skill in the art, a polynomial is a mathematical expression comprising one or more terms, each of which consists of a constant multiplied by one or more variables raised to a non-negative integer exponent (e.g. $a+bx+cx^2$, where a, b and c are the constants and x is the variable).

Polynomials are very common as they can be used to calculate a variety of values and/or model certain behaviour. For example, a point $(a_1, a_2, a_3)$ 102 is determined to be on one side of a triangle 104 defined by three points (0, 0, 0), $(b_1, b_2, b_3)$, and $(c_1, c_2, c_3)$ as shown in FIG. 1a if equation (1) below is true:

$$a_1 b_2 c_3 - a_1 b_3 c_2 - a_2 b_1 c_3 + a_2 b_3 c_1 + a_3 b_1 c_2 - a_3 b_2 c_1 \geq 0 \quad (1)$$

In another example, a line passing through the point (0,0,0) and $(v_1, v_2, v_3)$ 106 is determined to pass through a sphere 108 defined by a radius r and centre $(c_1, c_2, c_3)$, as shown in FIG. 1b, if equation (2) is true:

$$(v_1 c_1 + v_2 c_2 + v_3 c_3)^2 - (v_1^2 + v_2^2 + v_3^2)(c_1^2 + c_2^2 + c_3^2 - r^2) \geq 0 \quad (2)$$

In a further example, the line passing through the point (0,0,0) and $(v_1, v_2, v_3)$ 106 is determined to pass through a triangle 110 defined by three points $(a_1, a_2, a_3)$, $(b_1, b_2, b_3)$, and $(c_1, c_2, c_3)$, as shown in FIG. 1c, if equations (3a), (3b) and (3c) are all true:

$$a_1 b_2 v_3 - a_1 b_3 v_2 - a_2 b_1 v_3 + a_2 b_3 v_1 + a_3 b_1 v_2 - a_3 b_2 v_1 \geq 0 \quad (3a)$$

$$b_1 c_2 v_3 - b_1 c_3 v_2 - b_2 c_1 v_3 + b_2 c_3 v_1 + b_3 c_1 v_2 - b_3 c_2 v_1 \geq 0 \quad (3b)$$

$$c_1 a_2 v_3 - c_1 a_3 v_2 - c_2 a_1 v_3 + c_2 a_3 v_1 + c_3 a_1 v_2 - c_3 a_2 v_1 \geq 0 \quad (3c)$$

Evaluating polynomials has many real-world applications and in particular, the examples shown in the FIGS. 1b and 1c and described above are used in ray tracing, which is the modelling of real-world behaviour of light and is used in computer graphics.

When a polynomial is evaluated in hardware it may be evaluated using fixed point or floating point number representations. As is known to those skilled in the art a fixed point number representation is a representation of a number that has a fixed number of digits after the radix point (e.g. decimal point or binary point). In contrast, a floating point number representation of a number is a representation of a number where the radix point is not fixed (i.e. it can "float"). In other words the radix point can be placed anywhere within the representation.

The most common floating point standard is the Institute of Electrical and Electronics Engineers (IEEE) standard for floating-point arithmetic (IEEE-754). IEEE-754 specifies that floating point numbers are represented by three numbers: sign, exponent and mantissa (s, exp, mant). In general the three numbers (s, exp, mant) are interpreted, for a fixed integer bias, as shown in equation (4):

$$(-1)^s 2^{exp-bias} 1.\text{mant} \quad (4)$$

IEEE-754 defines the four basic formats shown in Table 1 for floating point numbers with varying degrees of precision. In particular, they are encoded with 16, 32, 64 and 128 bits respectively.

TABLE 1

| Type | Name | Sign Width | Exponent Width (ew) | Mantissa Width (mw) | Bias $2^{ew-1} - 1$ | Roundoff Error (u) |
|---|---|---|---|---|---|---|
| Half | F16 | 1 | 5 | 10 | 15 | $2^{-11}$ |
| Single | F32 | 1 | 8 | 23 | 127 | $2^{-24}$ |
| Double | F64 | 1 | 11 | 52 | 1023 | $2^{-53}$ |
| Quad | F128 | 1 | 15 | 112 | 16383 | $2^{-113}$ |

Floating point representations allow a greater range of numbers for the same number of bits (compared to fixed point number). Accordingly, both very large integers and small fractional numbers can be represented using floating point representations. However, since floating point numbers only have a limited number of bits they are prone to rounding errors. In particular, if the binary width of the exponent and mantissa are ew and mw respectively the number of bits of precision or significant bits is mw+1 (the floating point format has an implied bit of precision). The roundoff error u is half the distance between 1 and the next representable floating point value.

This rounding error inherent in floating point numbers means that performing arithmetic operations (e.g. evaluating polynomials) using floating point representations of the numbers (referred to herein as floating point arithmetic) does not always following standard real number arithmetic rules. For example, equations (5) below illustrate some of the problems with floating point arithmetic, where "^" above an operation (e.g. $\hat{\times}, \hat{+}, \hat{\div}$) denotes a floating point operation:

$$a \hat{+} 0 \neq a$$

$$a \hat{+} (b \hat{+} c) \neq (a \hat{+} b) \hat{+} c$$

$$a \hat{\times} (b \hat{\times} c) \neq (a \hat{\times} b) \hat{\times} c$$

$$a \hat{\times} (b \hat{+} c) \neq (a \hat{\times} b) \hat{+} (a \hat{\times} c) \quad (5)$$

$$a \hat{\times} (1 \hat{\div} a) \neq 1$$

$$a \hat{\times} (b \hat{+} c) \neq (a \hat{\times} b) \hat{+} (a \times c)$$

$$a \hat{\times} b = 0 \not\Rightarrow a = 0 \text{ or } b = 0$$

Accordingly floating point arithmetic is prone to error and adding more precision (e.g. bits to the floating point representation) does not always solve the problem. For example, consider a floating point implementation of the polynomial shown in equation (6):

$$(((333.75 b^6 + a^2(11 a^2 b^2 - 121 b^4 - 2)) + 5.5 b^8) - a^2 b^6) + \frac{a}{2b} \quad (6)$$

with the inputs a=77617 and b=33096. If the IEEE-754 single floating point representation (F32) is used (i.e. ew=8 and mw=23) the result is 1.17260361 . . . ; and if the IEEE-754 double floating point representation (F64) is used (i.e. ew=11 and mw=52) the result is 1.7260394005317847 . . . , despite the fact that the correct answer is −0.827396.

However, in certain situations evaluation of a polynomial using floating point arithmetic is required. For example, vertices are typically represented using floating point numbers and so to perform ray tracing (e.g. to determine correctly whether a ray intersects a particular triangle, as shown in FIG. 1c), hardware is required that can accurately evaluate polynomials using floating point arithmetic. In these examples, the evaluation of a polynomial is being used to make a binary decision (e.g. a YES/NO decision) and even trivial errors can result in huge visual differences when rendering a scene on a screen.

In another example of a binary decision that is made when rendering a scene by evaluating a polynomial is the determination of whether a particular triangle is behind or in front of another triangle. If this decision is not made correctly, the resultant rendered scene will look very different from the correctly rendered scene.

The embodiments described below are not limited to implementations which solve any or all of the disadvantages of known systems and method for evaluating polynomials using floating point components.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An accurate implementation of a polynomial using floating-point or other rounded arithmetic can be generated using a plurality of hardware logic components which each implement an input polynomial such that the zeros in the input polynomial can be determined correctly. The number of different hardware logic components that are used can be reduced by analysing the set of input polynomials and from it generating a set of polynomial components, where each polynomial in the set of input polynomials which is not also in the set of polynomial components, can be generated from a single one of the polynomial components.

A first aspect provides a method of generating an implementation of one or more polynomials using rounded arithmetic, the method comprising: receiving, in an input module, a set of input polynomials; reducing, in an assessment module, the set of input polynomials to a smaller set of polynomial components from which all the set of input polynomials can be evaluated accurately by only adding those polynomials from the input set of polynomials to the set of polynomial components which cannot be evaluated using other polynomials in the set of input polynomials or set of polynomial components; and generating an implementation of the one or more polynomials comprising a plurality of interconnected hardware logic elements, each of the hardware logic elements arranged to correctly evaluate one of the polynomial components using the rounded arithmetic and the plurality of hardware logic elements comprising at least one hardware logic element corresponding to each of the polynomial components.

A second aspect provides a system configured to generate an implementation of one or more polynomials using rounded arithmetic, the system comprising a polynomial component compiler module comprising: an input module arranged to receive a set of input polynomials generated from the one or more polynomials; an assessment module arranged to reduce the set of input polynomials to a smaller set of polynomial components from which all the set of input polynomials can be evaluated accurately by only adding those polynomials from the input set of polynomials to the set of polynomial components which cannot be evaluated using other polynomials in the set of input polynomials or set of polynomial components; and an output module arranged to output the set of polynomial components; and the system further comprising a design tool arranged to generate an implementation of the one or more polynomials comprising a plurality of interconnected hardware logic elements, each of the hardware logic elements arranged to correctly evaluate one of the polynomial components using the rounded arithmetic and the plurality of hardware logic elements comprising at least one hardware logic element corresponding to each of the polynomial components.

The implementation of one or more polynomials using rounded arithmetic may be embodied in hardware on an integrated circuit. There may be provided a method of manufacturing, at an integrated circuit manufacturing system, an implementation of one or more polynomials using rounded arithmetic. There may be provided an integrated circuit definition dataset that, when processed in an integrated circuit manufacturing system, configures the system to manufacture an integrated circuit comprising the implementation of one or more polynomials using rounded arithmetic. There may be provided a non-transitory computer readable storage medium having stored thereon a computer readable description of an integrated circuit that, when processed, causes a layout processing system to generate a circuit layout description used in an integrated circuit manufacturing system to manufacture an implementation of one or more polynomials using rounded arithmetic.

There may be provided an integrated circuit manufacturing system comprising: a non-transitory computer readable storage medium having stored thereon a computer readable integrated circuit description that describes the implementation of one or more polynomials using rounded arithmetic; a layout processing system configured to process the integrated circuit description so as to generate a circuit layout description of an integrated circuit embodying the implementation of one or more polynomials using rounded arithmetic; and an integrated circuit generation system configured to manufacture an integrated circuit comprising the implementation of one or more polynomials using rounded arithmetic according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1A:
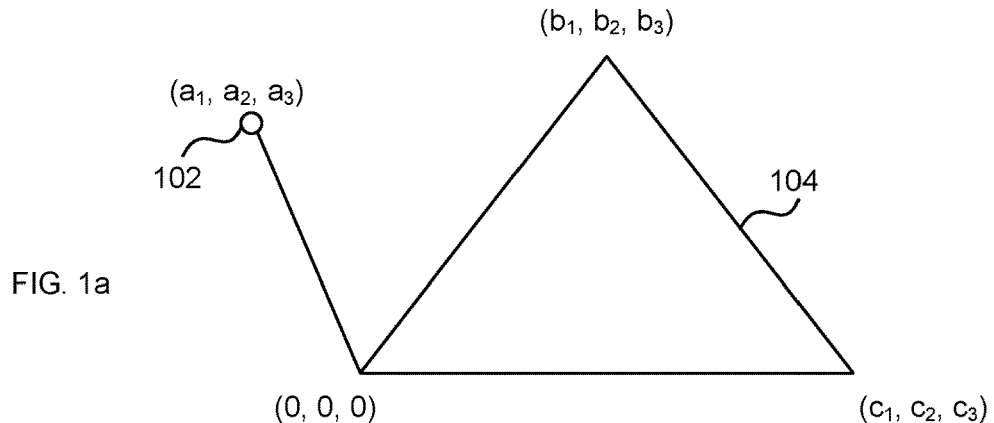
FIG. 1a is a schematic diagram of a triangle defined by three three-dimensional (3D) points.
Figure 1B:
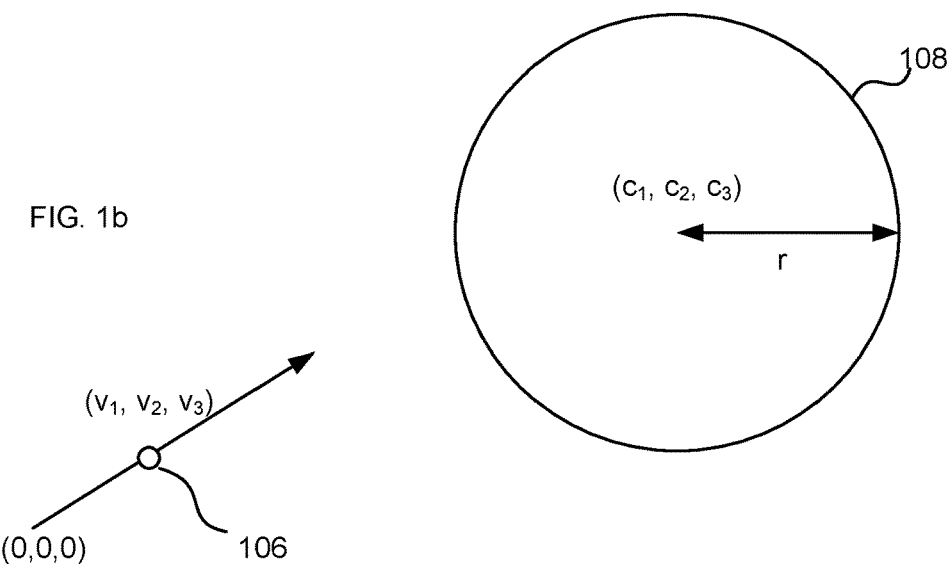
FIG. 1b is a schematic diagram of a circle defined by a radius and a 3D centre point and a ray defined by two 3D points.
Figure 1C:
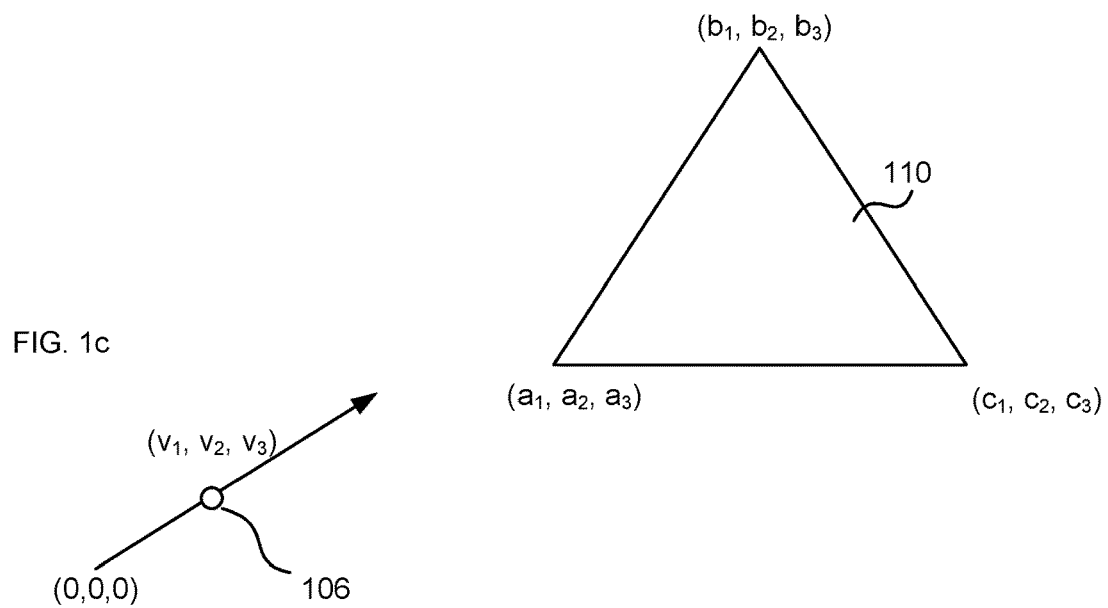
FIG. 1c is a schematic diagram of a triangle defined by three 3D points and a ray defined by two 3D points.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, there are many situations (e.g. in the field of computer graphics) where hardware needs to correctly make a binary decision based on an evaluation of a polynomial. Whilst the equations (5) above illustrate some of the problems with floating point arithmetic, hardware logic exists (e.g. can be built) which can accurately evaluate $a\hat{+}b$ and $a\hat{\times}b$ and these two operations (and the corresponding hardware logic that accurately implements each of them) may therefore be considered 'fundamental components'. There are also methods (and tools which implement these methods) that can determine whether it is possible to accurately implement a particular polynomial $P^i$ using these fundamental components (i.e. using only the hardware logic elements which can accurately evaluate $a\hat{+}b$ and $a\hat{\times}b$) and one example method is described in UK patent application GB 2527859 (published 6 Jan. 2016).

As described in GB 2527859, the first step in determining a floating point implementation of a polynomial that allows accurate evaluation thereof is determining whether the polynomial has an allowable variety. A floating point implementation of the polynomial has an allowable variety if the zeros can be determined correctly. If the zeros can be correctly determined, then evaluation of the polynomial can be used to correctly make a binary decision.

A floating point implementation of a polynomial is considered to determine the zeros correctly if the floating point implementation of the polynomial $\hat{p}$ is equal to zero when the corresponding real infinitely precise polynomial p is also equal to zero. This is represented by equation (7):

$$\hat{p}=0 \Leftrightarrow p=0 \qquad (7)$$

Figure 2A:
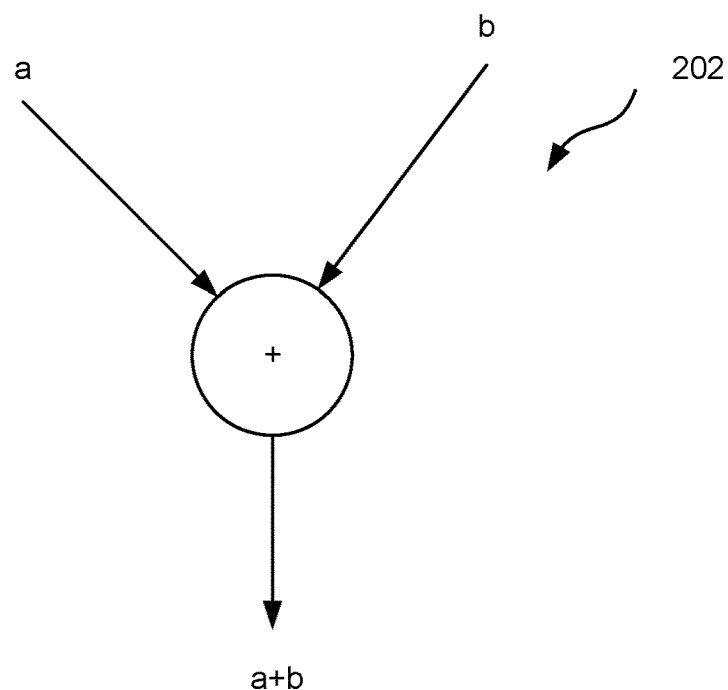
FIG. 2a is a schematic diagram of an example two-input floating-point adder.
Figure 2B:
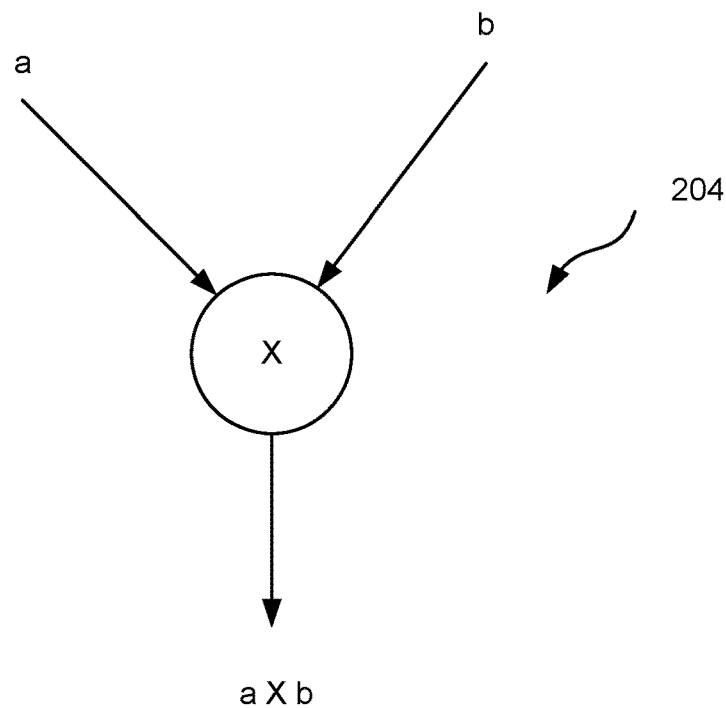
FIG. 2b is a schematic diagram of an example two-input floating-point multiplier.
Figure 3:
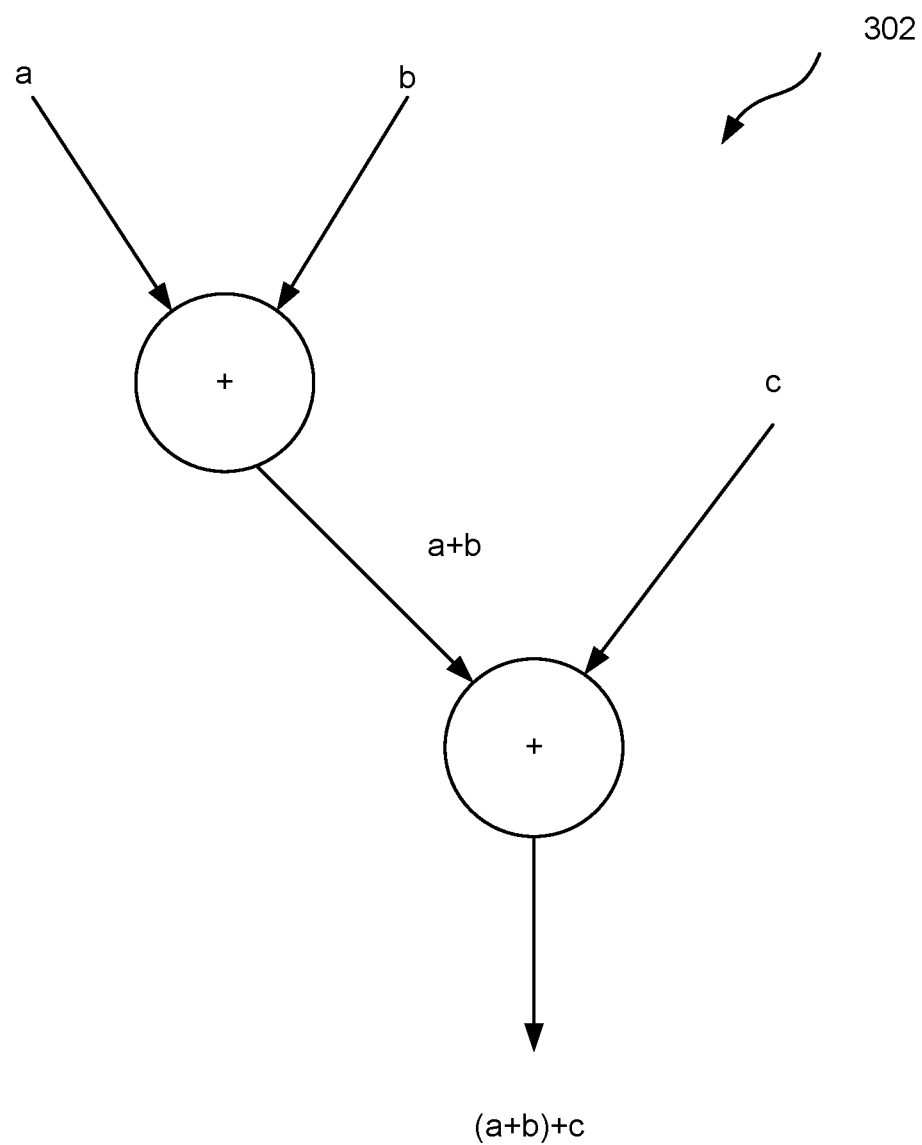
FIG. 3 is a schematic diagram of an example implementation of a three-input addition polynomial.

As noted above, it is known that floating point computations of the form $a\hat{+}b$ or $a\hat{\times}b$ can be performed accurately (assuming no underflow or overflow occur). In particular, as shown in FIG. 2a, if $a\hat{+}b=0$ then it implies that $a+b=0$ and vice versa. Similarly, as shown in FIG. 2b, if $a\hat{\times}b=0$ then it implies that $a\times b=0$ and vice versa (assuming no underflow or overflow occurs). Accordingly, it is assumed in GB 2527859 that only the floating point operations of two-input addition 202 and two-input multiplication 204 are available for the floating point implementation of a polynomial. For example, the polynomial $p=(a+b)+c$ may be implemented 302 as an addition of a+b and an addition of the output of a+b and c as shown in FIG. 3. The output of one operation or component that becomes the input of another operation or component is referred to herein as an intermediate signal. So in the example, the output of a+b would be considered an intermediate signal.

If tracing back a floating point implementation of a polynomial $\hat{p}$ when $\hat{p}=0$, there is a non-zero intermediate signal, X, which is the output of a non-trivial operator Y, and the inputs to Y can be altered without changing X and hence the entire implementation still returns zero, then it is possible to identify inputs such that $\hat{p}=0$ but that the infinitely precise $p\neq 0$.

For example, consider the polynomial $p=(a+b)+c$ which has a floating point implementation of $\hat{p}=(a\hat{+}b)\hat{+}c$, as shown in FIG. 3. If c=1, it can be seen that there are many floating-point numbers a and b whose output from a floating point adder ($\hat{+}$) is 1 but whose real sum is not 1. For example, if a=0.1000 . . . 000 and b=0.1000 . . . 001, $a\hat{+}b$ will be 1 resulting in $(a\hat{+}b)\hat{+}c$ being 0. In another example, if a=0.1000 . . . 000 and b=0.01 . . . 111 [so b is just under a half], the output of $(a\hat{+}b)\hat{+}c$ will be zero even though (a+b)+c is not zero. Accordingly, there are cases where $\hat{p}$ will be zero even though p is not zero (i.e. $p\neq 0=\hat{p}$). The polynomial p therefore does not have an allowable variety.

Accordingly, for a floating point implementation of a polynomial $\hat{p}$ to correctly calculate the zeros, when $\hat{p}=0$, all non-trivial operators within the implementation must produce zero. Since some of the non-trivial operators act on the inputs to the polynomial then certain inputs must have the property that $x_i=0$ or $x_j\pm x_k=0$. Accordingly if a polynomial can be represented as a union of constraints of the form $x_i=0$, or $x_j\pm x_k=0$ (as shown in equations (8)) the polynomial is considered to have an allowable variety. Otherwise the polynomial does not have an allowable variety.

$$p=\bigvee\bigwedge\{x_i op x_j=0\}$$
$$op=\{+,-,\times\} \qquad (8)$$
$$p=\bigvee\bigwedge\{x_i=0, x_j\pm x_k=0\}$$

In other words a polynomial has an allowable variety if the conditions for the polynomial being zero (i.e. equality) can be written in the form $x_i=0$ or $x_j\pm x_k=0$. Each zero condition (e.g. condition of the form $x_i=0$ or $x_j\pm x_k=0$)) defines a sub-variety.

For example, consider the Motzkin polynomial shown in equation (9):

$$z^6+x^2y^2(x^2+y^2-3z^2) \qquad (9)$$

Equality (i.e. the polynomial is zero) occurs when z=y=0, or z=x=0, or $\pm z=\pm y=\pm x$. Accordingly, the Motzkin polynomial of equation (9) has an allowable variety since it satisfies the property shown in equations (8) above.

If a polynomial has an allowable variety then accurate evaluation of the polynomial using only floating point adder and multiplier components (i.e. the 'fundamental components' may be possible.

As noted in GB 2527859, for a floating point implementation of a polynomial $\hat{p}$ to correctly calculate the zeros using only the fundamental components, when $\hat{p}=0$, all non-trivial operators within the implementation must produce zero. In the event that a polynomial fails this test, i.e. it is determined that the polynomial does not have an allowable variety, the method (and hence a tool implementing the method) may output a message indicating that the polynomial cannot be accurately evaluated (e.g. as shown in FIG. 3 of GB 2527859).

When a method (such as the one described in GB 2527859) determines that the polynomial cannot be accurately evaluated, additional information may also be generated, such as a list of one or more floating point components that would be necessary for an accurate implementation (e.g. such that if these floating point components could be implemented accurately and hence be added to the set of fundamental components, then the polynomial could be accurately evaluated).

Described herein is a method which takes as input a list of floating point components required to implement a polynomial accurately (in addition to the fundamental components of floating point addition of two inputs and floating point multiplication of two inputs as shown in FIGS. 2a and 2b) and determines which subset of these components are actually necessary in order to implement the polynomial accurately. The remaining components (i.e. those that are not in the subset) can be evaluated using one (i.e. just a single one) of the components in the identified subset. The resulting hardware that evaluates the polynomial (and which may be fabricated in silicon) includes a plurality of interconnected hardware logic elements, each hardware logic element being arranged to accurately implement one of the components in the subset and the plurality of hardware logic elements comprising at least one hardware logic element corresponding to (i.e. arranged to implement) each of components in the identified subset.

For example, if the identified subset comprises 5 components, denoted $c_A$, $c_B$, $c_C$, $c_D$ and $c_E$, the hardware logic which accurately implements the polynomial comprises at least one hardware logic element (e.g. element A) which is arranged to accurately evaluate component $c_A$, at least one hardware logic element (e.g. element B) which is arranged to accurately evaluate component $c_B$, at least one hardware logic element (e.g. element C) which is arranged to accurately evaluate component $c_C$, at least one hardware logic element (e.g. element D) which is arranged to accurately evaluate component $c_D$ and at least one hardware logic element (e.g. element E) which is arranged to accurately evaluate component $c_E$. Elements A-E are interconnected in a manner to evaluate the polynomial and there may be more than one of any of the elements A-E in any implementation.

Whilst the method is described with reference to floating point, it may also be used for other number formats which, like floating point, involve rounded arithmetic and hence, for which there are a limited set of fundamental components (e.g. unlike fixed point inputs).

Figure 4:
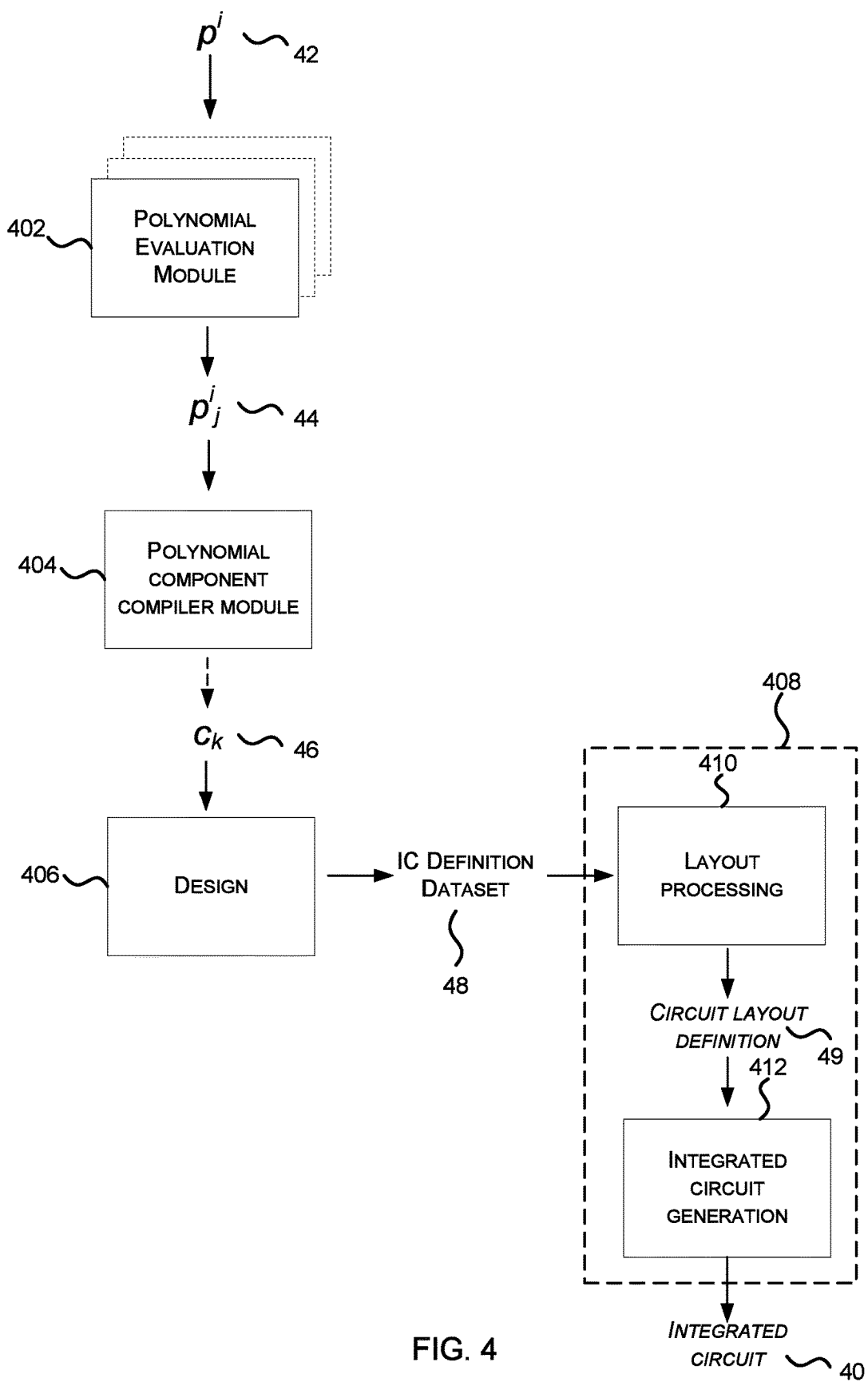
FIG. 4 is a schematic diagram showing the functional elements involved in generating and fabricating an integrated circuit that can accurately implement one or more input polynomials for floating point inputs.

FIG. 4 is a schematic diagram showing the functional elements involved in generating and fabricating an integrated circuit (IC) 40 (i.e. physical hardware) that can accurately implement one or more polynomials $P^i$ 42 for floating point inputs (or inputs which use a number format which involves rounded arithmetic, as noted above).

As shown in FIG. 4, a polynomial evaluation module 402 receives one or more polynomials $P^i$ 42 and outputs a set of polynomials $p_j^i$ 44 for each polynomial $P^i$. The polynomial evaluation module 402 may use the method described in GB 2527859 (as summarized above) or any other suitable method (e.g. a computer algebra package which is capable of this real algebraic variety decomposition) to generate the set of polynomials $p_j^i$ 44. The i sets of polynomials $p_j^i$ 44 (where i≥1 and j≥1) are then input to a polynomial component compiler module 404 which is described in more detail below.

The i sets of polynomials $p_j^i$ 44 (where i≥1 and j≥1) which form the inputs to a polynomial component compiler module 404 (and hence may be referred to as a set of input polynomials) may comprise polynomials corresponding to any non-trivial operators which did not produce zero (as described above). The set of input polynomials may comprise any collection of floating point polynomials where the inputs all have the same format (i.e. the same precision and the same accuracy of calculation) and all outputs have the same format, although the format of the outputs may be the same as, or may be different from, the format of the inputs.

The polynomial component compiler module 404 reduces the set(s) of polynomials $p_j^i$ 44 which are input to the polynomial component compiler module 404 (and may, in various examples, be referred to as 'intermediate polynomials' to distinguish them from the polynomials $P^i$ 42) to a concise set of components $c_k$ 46 which are required to accurately implement the one or more polynomials $P^i$ 42 for floating point inputs (or inputs which use a number format which involves rounded arithmetic, as noted above), where k≥$\Sigma_{i,j}$. Unlike the sets of polynomials $p_j^i$ 44, the set of components $c_k$ 46 is an irreducible and minimal set of components and therefore the polynomial component compiler module 404 determines the smallest (i.e. least complex) components and the smallest number of components that are required to accurately implement the one or more (i.e. i) polynomials $P^i$ 42.

Having generated the set of components $c_k$ 46, it is these k components which are implemented in hardware rather than the set(s) of polynomials $p_j^i$ 44. Whilst it might be theoretically possible to implement each of the set(s) of polynomials $p_j^i$ 44 accurately in hardware (i.e. all $\Sigma_{i,j}$ polynomials), the resultant hardware logic would be large in area, very time consuming to create, difficult to formally verify as correct and have a much higher power consumption than the hardware logic 40 which implements the minimal set of components $c_k$ 46 accurately for floating point inputs (or inputs using an alternative number format which involves rounded arithmetic).

FIG. 4 also shows the implementation of the set of components $c_k$ 46 in hardware. These components are input to a design phase 406 which generates an IC definition dataset 48 that accurately implements the one or more polynomials $P^i$ 42. The design phase 406 may first generate RTL which is then passed through synthesis tools which produce the IC definition dataset 48. The IC definition dataset 48 includes a definition of a plurality of interconnected hardware logic elements, with each element being arranged to accurately evaluate one of the components $c_k$ for floating point (or similar) inputs, and the plurality of interconnected hardware logic elements comprising at least one element associated with (i.e. arranged to accurately implement) each of the components $c_k$.

An IC manufacturing system 408 is configured to receive the IC definition dataset 48, process the IC definition dataset 48, and generate the IC 40 according to the IC definition dataset (e.g. which accurately evaluates the one or more polynomials $P^i$ 42). The processing of the IC definition dataset 48 configures the IC manufacturing system 408 to manufacture an integrated circuit embodying the one or more polynomials $P^i$ 42 as described in any of the examples herein. As shown in FIG. 4, the IC manufacturing system 408 comprises a layout processing system 410 and an integrated circuit generation system 412.

The layout processing system 410 is configured to receive and process the IC definition dataset 48 to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition 49 to the IC generation system 1006. A circuit layout definition may be, for example, a circuit layout description.

The IC generation system 412 generates an IC according to the circuit layout definition 49, as is known in the art. For example, the IC generation system 412 may implement a semiconductor device fabrication process to generate the IC 40, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC 40 according to the circuit definition 49. Alternatively, the circuit layout definition 49 provided to the IC generation system 412 may be in the form of computer-readable code which the IC generation system 412 can use to form a suitable mask for use in generating an IC 40.

The different processes performed by the IC manufacturing system 408 may be implemented all in one location, e.g. by one party. Alternatively, the IC manufacturing system 408 may be a distributed system such that some of the processes may be performed at different locations, and may be performed by different parties. For example, some of the stages of: (i) synthesising RTL code representing the IC definition dataset 48 to form a gate level representation of a circuit to be generated, (ii) generating a circuit layout 49 based on the gate level representation, (iii) forming a mask in accordance with the circuit layout 49, and (iv) fabricating an integrated circuit 40 using the mask, may be performed in different locations and/or by different parties.

In other examples, processing of the integrated circuit definition dataset 48 at an integrated circuit manufacturing system 408 may configure the system to manufacture an IC 40 without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 4 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 4, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Figure 5:
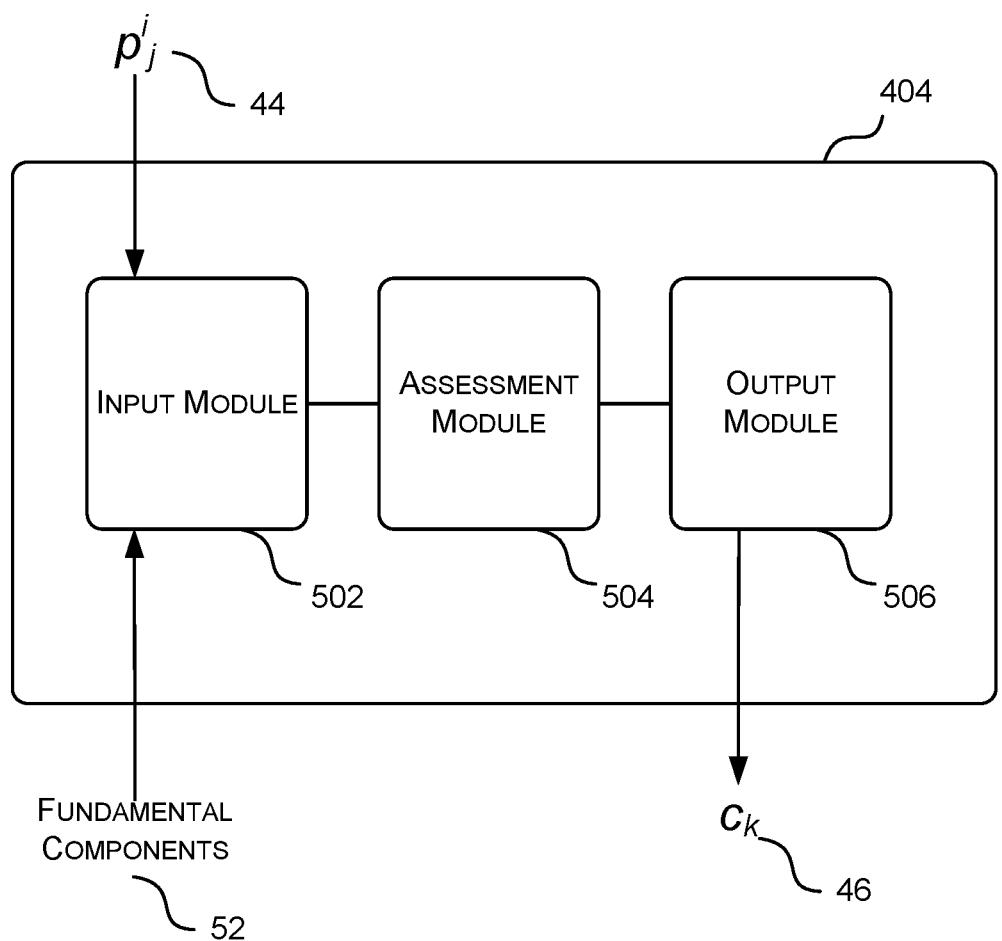
FIG. 5 is a schematic diagram of an example polynomial component compiler module.

The polynomial component compiler module 404 can be described in more detail with reference to FIGS. 5 and 6. FIG. 5 is a schematic diagram of the polynomial component compiler module 404 which reduces a set of polynomials $p_j^i$ 44 to a concise (i.e. minimal) set of components $c_k$ 46 and which can then subsequently be implemented in hardware (as described above and shown in FIG. 4). The polynomial component compiler module 404 comprises an input module 502, an assessment module 504 and an output module 506.

The input module 502 receives a set of polynomials $p_j^i$ 44 which are required to be able to accurately evaluate one or more polynomials $P^i$ 42 hardware using floating point arithmetic (or an alternative number format which involves rounded arithmetic). The input module 502 may also receive data identifying the fundamental components 52, e.g. the floating point operations (e.g. $\hat{\times}$, $\hat{+}$) that are available to evaluate the polynomial (because the components can be fabricated which accurately perform these operations).

The assessment module 504 performs the reduction of the set of polynomials $p_j^i$ 44 and this is described in detail with reference to FIG. 6. The output module 506 outputs the set of components $c_k$ 46.

Figure 6:
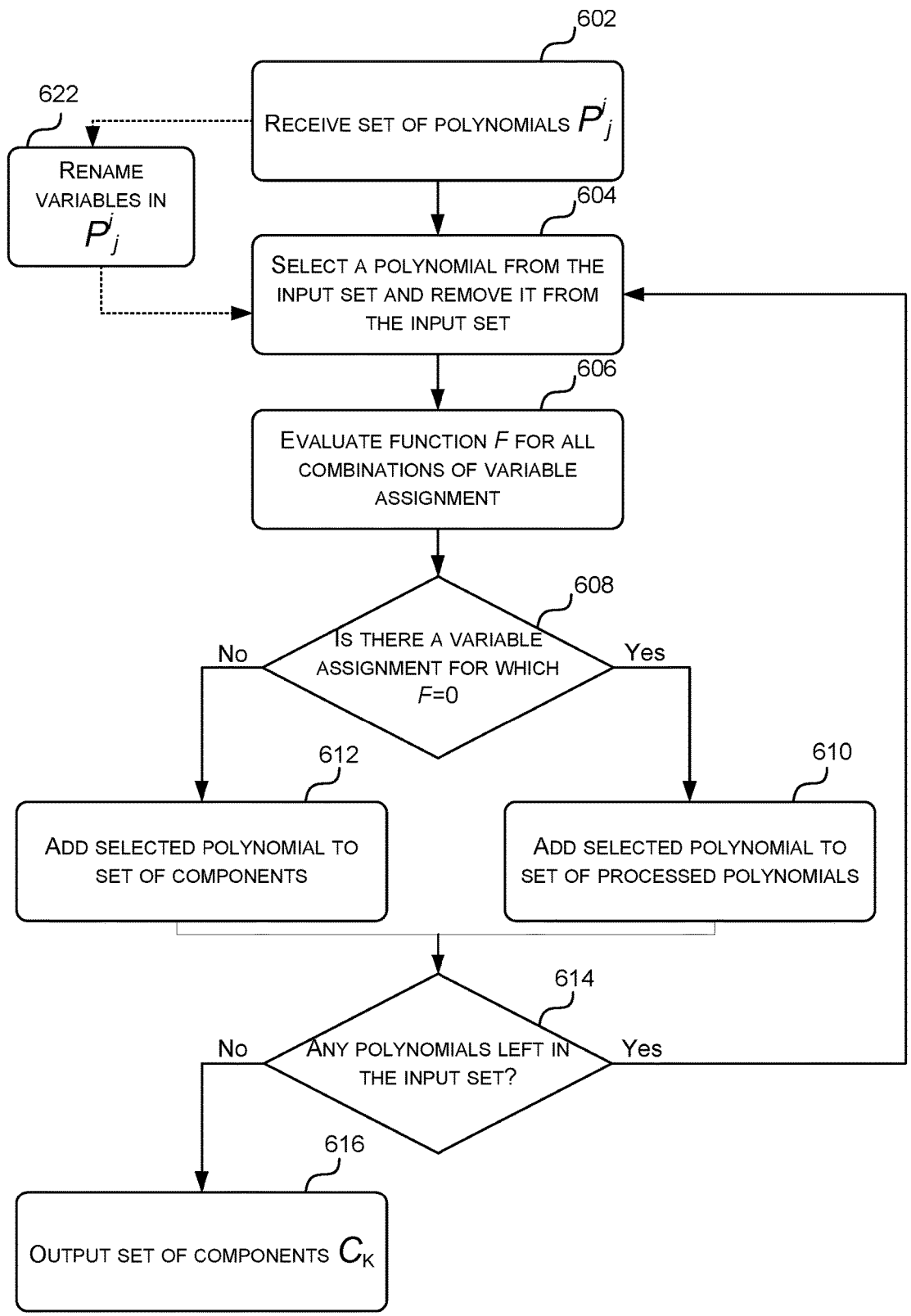
FIG. 6 is flow diagram showing an example method of operation of a polynomial component compiler module, such as the one shown in FIG. 5.

As shown in FIG. 6, the assessment module 504 receives the set of polynomials $p_j^i$ 44 (block 602). These input polynomials may for example be considered to have variables $x_i$ and coefficients which are either +1 or −1 and for the purposes of the following explanation, this set may be called Polys, such that:

$$\text{Polys}=p_j^i=\{p_1,p_2,\ldots,p_n\}$$

The output set of components $c_k$ is initially empty and may also be called Comps.

The assessment module 504 selects a polynomial from the input set, Polys, and removes the selected polynomial from the input set (block 604). The selected polynomial may now be called q and considered to have variables $y_i$ (the coefficients will be either +1 or −1 as described above).

The values of a function F is then evaluated using the selected polynomial q over all possible combinations of variable assignments (block 606) to determine if there exists a collection of α, β, γ such that:

$$x_\alpha=0, x_\beta \pm y_\gamma = 0 \Rightarrow F=(p_1(x)-q(y))(p_2(x)-q(y))\ldots(p_n(x)-q(y))=0$$

If there exists a collection of α, β, γ such that the above expression holds ('Yes' in block 608), then there exists some polynomial in Polys (e.g. some $p_z$) that can be used to evaluate the selected polynomial q and so the selected polynomial q does not need to be one of the output set and instead can be discarded, e.g. by adding it to the set of processed polynomials (block 610).

In contrast, if there does not exist a collection of α, β, γ such that the above expression holds ('No' in block 608), then no other polynomial in Polys (e.g. no $p_z$) can be used to evaluate the selected polynomial q and so the selected polynomial q is added to the set of components, Comps (block 612) which are output at the end of the assessment (block 616).

The method is then repeated until all the polynomials in the original input set (as received in block 602) have been considered ('No' in block 614). After the first iteration of this method, the set of components, Comps, may not be an empty set. Consequently, when performing the evaluation of the function (in block 606), the polynomials $p_1(x)\ldots p_n(x)$ include all those polynomials which remain in the input set Polys and all those polynomials which have been added to the set of components, Comps (in block 612).

So in a subsequent iteration, where Comps is not an empty set, if there exists a collection of α, β, γ such that the expression $$x_\alpha=0, x_\beta \pm y_\gamma = 0 \Rightarrow F=(p_1(x)-q(y))(p_2(x)-q(y))\ldots(p_n(x)-q(y))=0$$

holds ('Yes' in block 608), then there exists some polynomial in either Polys or Comps (e.g. some $p_z$) that can be used to evaluate the selected polynomial q and so the selected polynomial q does not need to be one of the output set and instead can be discarded, e.g. by adding it to the set of processed polynomials (block 610).

In contrast, in a subsequent iteration, where Comps is not an empty set, if there does not exist a collection of α, β, γ such that the expression $$x_\alpha=0, x_\beta \pm y_\gamma = 0 \Rightarrow F=(p_1(x)-q(y))(p_2(x)-q(y))\ldots(p_n(x)-q(y))=0$$

holds ('No' in block 608), then no other polynomial in either Polys or Comps (e.g. no $p_z$) can be used to evaluate the selected polynomial q and so the selected polynomial q is added to the set of components, Comps (block 612) which are output at the end of the assessment (block 616).

The method of FIG. 6 may also be written as:

```
Inputs p₁, . . . , pₙ       set of polynomials with ±1 coefficients
Outputs c₁, c₂, . . .       set of components needing to be built
begin
Comps = { }
Processed = { }
Polys = {p₁, p₂, . . . , pₙ}
while Polys ≠ { } do
    select any polynomial q from Polys
    Polys −= {q}

F(x₁, . . . , xₘ, y₁, . . . , yᵣ) =  ∏         (p_z(x) − q(y))
                                      p_z∈Comps∪Polys contained = false for all S ⊂ {  x₁, . . . , xₘ,
                   x₁ + y₁, x₁ + y₂, . . . , x₁ + yᵣ,
                   . . .
                   xₘ − y₁, xₘ − y₂, . . . , xₘ − yᵣ  } do if ∄x, y such that S(x, y) = 0 and P(x, y) ≠ 0 then
            contained = true
            break
        end if
    end
    if contained then
        Processed ∪ {q}
    else
        Comps ∪ {q}
    end if
end
return Comps
end
```

In this algorithm, a subset S corresponds to a particular variable assignment, i.e. a particular collection of α, β, γ, and consequently the for all . . . do . . . loop above performs the search to determine if there exists a collection of α, β, γ such that the following expression holds:

$$x_\alpha=0, x_\beta \pm y_\gamma = 0 \Rightarrow F=(p_1(x)-q(y))(p_2(x)-q(y))\ldots(p_n(x)-q(y))=0$$

It can be seen that the above algorithm has the decision point (in block 608) described differently, as it asks if there is no variable assignment that gives $S(x,y)=0$ and $P(x,y)\neq 0$ and if that is true, then q is added to the set of processed polynomials, Processed (block 610). The result of the reworded question has, however, the same effect as that shown in FIG. 6.

The evaluation of the function F over all variable assignments (in block 606, or finding of any solutions to $S(x,y)=0$ and $P(x,y)\neq 0$) may be performed using a computational algebra package and an example command in Maple v18.0 (a computer algebra system developed by Maplesoft™) is:

```
with(SolveTools)
SemiAlgebraic({x1=0, x1+y1=0, x1−y2=0, p<>0})
```

The output set of components that is determined by the assessment module 504 using the method described above (and shown in FIG. 6), is independent of the precision used for the floating point notation.

There are a number of ways in which the method described above may be optimized and various optimizations are described below. It will be appreciated that when implementing the method, none, one or more of these optimizations may be used.

In an optimization, variable renaming may be applied to the set of polynomials $p_j^i$ 44 (block 622) which are input to the polynomial component compiler module 404 and this renaming may, for example, be implemented by the input module 502 or by the assessment module 504. To perform the variable renaming (in block 622), the variables in each polynomial $p_j^i$ are renamed to be the contiguous $x_1$, $x_2$, . . . . For example, given a set of polynomials:

$$(x-y),(w+s-t),(-s+u),(x+y-z)$$

these may be renamed as follows:

$$(x_1-x_2),(x_1+x_2-x_3),(-x_1+x_2),(x_1+x_2-x_3)$$

As shown in the example above, each of the set of polynomials which are input have their variables replaced by variables from a common set of variables.

By performing variable renaming (in block 622), the complexity of the method (or algorithm) is reduced. If the total number of variables in the collection is polynomials $p_j^i$ is m, then the number of operations is of order $2^{m^2}$ and the run time is exponential in the total number of variables m. By performing variable renaming, m is reduced and so is the number of operations and hence run time.

In the method described above, any polynomial is selected from the input set (in block 604); however, in an optimization, the polynomial q may be selected (in block 604) according to pre-defined criteria. In an example, q may be selected (in block 604) based on the total degree, number of variables and/or number of terms in each polynomial. In an example, q may be selected (in block 604) if it is the polynomial in the input set (Polys) which has the least number of variables amongst the polynomials of least total degree. For example, the polynomial abc+d+e+f has 4 terms, 6 variables and a total degree of 3. The total degree of a polynomial is the largest multiplicity of any of the terms, e.g. a term $x^{\theta_1}y^{\theta_2}z^{\theta_3}$ has a total degree of $\theta_1+\theta_2+\theta_3$.

In the method described above, all the polynomials that are currently remaining in the input set (Polys) and all the polynomials that are currently in the set of components (Comps) are used in constructing F (which is used in block 606), i.e.:

$$F(x_1, \ldots, x_m, y_1, \ldots, y_r) = \prod_{p_z \in Comps \cup Polys} (p_z(x) - q(y))$$

However, in an optimization, the polynomials $p_z(x)$ are filtered based on a comparison of the total degree, number of variables and/or number of terms in each polynomial and the total degree, number of variables and/or number of terms in the selected polynomial q.

In an example, the polynomials $p_z(x)$ are filtered such that only those polynomials in the input set (Polys) and the set of components (Comps) that meet all the following criteria are considered:

total degree of $p_z \geq$ total degree of $q$ number of variables of $p_z \geq$ number of variables of $q$ number of terms of $p_z \geq$ number of terms of $q$ This filtering can be used because if a polynomial $p_z$ can be used to evaluate q (resulting in a 'Yes' in block 608), then the total degree, number of variables and number of terms of $p_z$ must equal or exceed that of q.

By reducing the number of polynomials that are used in constructing F (in block 606), the complexity of the computational algebra is reduced (which reduces runtime in both the number of iterations within the algorithm and expected runtime of any computer algebra commands).

In the method described above, all combinations of variable assignment are considered when evaluating F (in block 606). In an optimization, however, each particular variable assignment (e.g. collection of α, β, γ or subset S) is checked to see if it can be simplified before evaluating F. This check may, for example, be performed by writing the variable assignment equations in matrix form and then putting the matrix into reduced row echelon form. If putting the matrix into reduced row echelon form results in simplification of the matrix (e.g. where the reduced row echelon form is not the same as the original matrix), then that particular variable assignment (e.g. that subset S) can be skipped when evaluating F (because any simplification means that the variable assignments can be rewritten in simpler form, which in turn means a simpler variable assignment is possible, which will have been covered in a previous iteration).

For example, the equations $x_1=0$, $x_2+y_1=0$ and $x_2-y_1=0$ can be written as:

$$\begin{pmatrix} 1 & 0 & 0 \\ 0 & 1 & 1 \\ 0 & 1 & -1 \end{pmatrix} \begin{pmatrix} x_1 \\ x_2 \\ y_1 \end{pmatrix} = 0$$

It can be seen that this matrix can be simplified (e.g. by setting a variable $x_\alpha$ equal to a variable $y_\gamma$ which is not allowed, e.g. $x_2=y_1$ in this example) and hence this particular variable assignment can be ignored when evaluating F.

As noted above, none, one or more of these four optimizations may be implemented. If all four optimizations are used, the resulting method may be written as:

```
Inputs p₁, ... , pₙ set of polynomials with ± 1 coefficients
Outputs c₁, c₂, ... set of components needing to be built
begin
# rename variables of pᵢ
for i from 1 to n do pᵢ = pᵢ(x₁, x₂, ... ) end
        Comps = { }
    Processed = { }
        Polys = {p₁, p₂, ... ,pₙ}
while Polys ≠ { } do
    select polynomial q of lowest total degree & variable count from
    Polys
        Polys -= {q}
```

$$F(x_1, \ldots, x_m, y_1, \ldots, y_r) = \prod_{\substack{p_i \in Comps \cup Polys \\ total\ degree\ of\ p_i \geq q \\ number\ of\ variables\ of\ p_i \geq q \\ number\ of\ terms\ of\ p_i \geq q}} (p_i(x) - q(y))$$

```
    contained = false
```

$$\text{for all } S \subset \left\{ \begin{array}{c} x_1, \ldots, x_m, \\ x_1+y_1, x_1+y_2, \ldots, x_1+y_r, \\ \ldots \\ x_m-y_1, x_m-y_2, \ldots, x_m-y_r, \end{array} \right\} \text{do}$$

```
    M = matrix of equations of S
    if sort(M) = sort (reduced row echelon form(M)) then next end if
    if ∄x, y such that S(x, y) = 0 and P(x, y) ≠ 0 then
        contained = true
        break
        end if
    end
    if contained then Processed ∪ {q} else Comps ∪ {q} end if
    end
    return Comps
end
```

In the methods described above, the coefficients of the polynomials $p_j^i$ 44 (as received in block 602) are either +1 or −1 and as such the method will not recognize that a+b+c can be implemented by a+bd+ce by setting d=e=1. Nor will it recognize that a+2b could be implemented by a+bc by setting c=2. If the methods described above are modified to include constants, then the number of variables increases (and so the run time of the assessment operation increases); however, the resulting set of components $c_k$ 46 may be smaller, leading to a potentially smaller integrated circuit 40.

In an example implementation, the $x_i$ variables may be allowed to take values ±1 and ± any of the absolute values of the constants that appear in the expanded polynomials of $p_i$. The resulting method (including the four optimizations described above) may then be written as:

```
Inputs p₁, ... , pₙ set of polynomials with ± 1 coefficients
Outputs c₁, c₂, ... set of components needing to be built
begin
# rename variables of pᵢ
for i from 1 to n do pᵢ = pᵢ(x₁, x₂, ... ) end
K = set of absolute values of coefficients of the expanded polynomials
pᵢ
                    K ∪ {1}
Comps = { }
Processed = { }
Polys = {p₁, p₂, ... , pₙ}
while Polys ≠ { } do
    select polynomial q of lowest total degree & variable count from
    Polys
        Polys -= {q}
```

-continued $$F(x_1, \ldots, x_m, y_1, \ldots, y_r) = \prod_{\substack{p_i \in Comps \cup Polys \\ total\ degree\ of\ p_i \geq q \\ number\ of\ variables\ of\ p_i \geq q \\ number\ of\ terms\ of\ p_i \geq q}} (p_i(x) - q(y))$$

contained = false
produce all subsets involving xi, $x_i \pm y_j$ and $x_i \pm k_i$ where $k_i \in K$ for all $S \subset \left\{ \begin{array}{l} x_1, \ldots, x_m, \\ x_1 \pm y_1, x_1 \pm y_2, \ldots, x_1 \pm y_r, \ldots \\ x_m \pm y_1, x_m \pm y_2, \ldots, x_m \pm y_r, \\ x_1 \pm k_1, x_1 \pm k_2, \ldots \\ x_m \pm k_1, x_m \pm k_2, \ldots \end{array} \right\}$ do M = matrix of equations of S
if sort(M) = sort (reduced row echelon form(M)) then next end if
if $\exists x, y$ such that $S(x, y) = 0$ and $P(x, y) \neq 0$ then
  contained = true
  break
  end if
end
if contained then Processed $\cup \{q\}$ else Comps $\cup \{q\}$ end if
end
return Comps
end Although in the implementation above the $x_i$ variables may be allowed to take values ±1 and ± any of the absolute values of the constants that appear in the expanded polynomials of $p_i$, in other examples, the $x_i$ variables may be allowed to take other values. Furthermore, although the implementation above shows the use of all four optimizations, as described above, in other implementations, none, one or more of the optimizations may be used.

In can be seen that the polynomial component compiler module 404 (and in particular the assessment module 504) uses a single question or function F in order to determine whether to add a selected polynomial q to the output set Comps or not. When evaluating F, it is not necessary to determine exactly which polynomial in Comps or Polys can be used to evaluate the selected polynomial q but only to identify that there is one polynomial in Comps or Polys can be used to evaluate the selected polynomial q and this reduces algorithm complexity and runtime.

Although the polynomial component compiler module 404 is shown in FIG. 4 (and described above) as being used to reduce a set of polynomials 44 output by a polynomial evaluation module 404, it will be appreciated that the polynomial component compiler module 404 may also be used to reduce a set of polynomials which are generated in any other way. The algorithm may also be extended to extract exactly how all the polynomials can be implemented using the components and thus form part if a normal compiler activity.

The system of FIG. 4 and polynomial component compiler module 404 of FIG. 5 are shown as comprising a number of functional blocks. This is schematic only and is not intended to define a strict division between different logic elements of such entities. Each functional block may be provided in any suitable manner. It is to be understood that intermediate values described herein as being formed by a particular functional block need not be physically generated by the that block at any point and may merely represent logical values which conveniently describe the processing performed by the block between its input and output.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an integrated circuit which implements a polynomial. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method of generating an implementation of one or more polynomials using rounded arithmetic, the method comprising:
receiving, in an input module, a set of input polynomials generated from the one or more polynomials;

reducing, in an assessment module, the set of input polynomials to a smaller set of polynomial components from which all the set of input polynomials can be evaluated accurately, by only adding those polynomials from the input set of polynomials which cannot be evaluated using other polynomials in the set of input polynomials or set of polynomial components to the set of polynomial components; and generating an implementation of the one or more polynomials comprising a plurality of interconnected hardware logic elements, each of the hardware logic elements arranged to correctly evaluate one of the polynomial components using the rounded arithmetic and the plurality of hardware logic elements comprising at least one hardware logic element corresponding to each of the polynomial components.

2. A method according to claim 1, wherein reducing the set of input polynomials to a smaller set of polynomial components from which all the set of input polynomials can be evaluated accurately comprises:
(i) removing a polynomial q from the set of input polynomials;
(ii) determining if there is any variable assignment for which a function F is equal to zero, where:

$$F(x_1, \ldots, x_m, y_1, \ldots, y_r) = \prod_{p_z} (p_z(x) - q(y))$$

where $p_z$ is the union of the set of input polynomials and the set of polynomial components;
(iii) in response to determining that there is no variable assignment for which a function F is equal to zero, adding the polynomial q to the set of polynomial components and in response to determining that there is a variable assignment for which a function F is equal to zero, not adding the polynomial q to the set of polynomial components; and
repeating (i)-(iii) until all polynomials have been removed from the set of input polynomials.

3. A method according to claim 2, wherein removing a polynomial q from the set of input polynomials comprises:
selecting a polynomial q from the set of input polynomials and removing the polynomial q from the set of input polynomials.

4. A method according to claim 3, wherein the polynomial q is selected from the set of input polynomials based on pre-defined criteria.

5. A method according to claim 3, wherein the polynomial q is selected from the set of input polynomials based on a total degree, number of variables and/or number of terms in each polynomial in set the of input polynomials.

6. A method according to claim 3, wherein the polynomial q is selected from the set of input polynomials if it has a least number of variables amongst the polynomials of least total degree.

7. A method according to claim 2, further comprising:
filtering $p_z$ based on a total degree, number of variables and/or number of terms in each polynomial in the set of input polynomials prior to determining if there is any variable assignment for which a function F is equal to zero.

8. A method according to claim 7, wherein $p_z$ is filtered such that it comprises only those polynomials that meet all the following criteria:

total degree of $p_z \geq$ total degree of $q$ number of variables of $p_z \geq$ number of variables of $q$ number of terms of $p_z \geq$ number of terms of $q$ 9. A method according to claim 2, wherein determining if there is any variable assignment for which a function F is equal to zero comprises evaluating F only for variable assignments which cannot be simplified.

10. A method according to claim 9, further comprising:
checking if a variable assignment can be simplified by expressing one or more variable assignments in matrix form, putting the matrix into reduced row echelon form and determining if the reduced row echelon form results in a simplification of the matrix.

11. A method according to claim 2, wherein determining if there is any variable assignment for which a function F is equal to zero comprises determining if there is any variable assignment for which the single function F is equal to zero.

12. A method according to claim 1, further comprising:
performing variable renaming on the received set of input polynomials prior to reducing the set of input polynomials to a smaller set of polynomial components from which all the set of input polynomials can be evaluated accurately.

13. A method according to claim 12, wherein performing variable renaming on the received set of input polynomials comprises:
replacing variables in each of the received set of input polynomials with variables from a common set of variables.

14. A method according to claim 1, wherein the one or more polynomials have floating point inputs.

15. A method according to claim 1, further comprising:
fabricating an integrated circuit comprising the implementation of the one or more polynomials.

16. A system configured to generate an implementation of one or more polynomials using rounded arithmetic, the system comprising a polynomial component compiler module comprising:
an input module arranged to receive a set of input polynomials generated from the one or more polynomials;
an assessment module arranged to reduce the set of input polynomials to a smaller set of polynomial components from which all the set of input polynomials can be evaluated accurately, by only adding those polynomials from the input set of polynomials which cannot be evaluated using other polynomials in the set of input polynomials or set of polynomial components to the set of polynomial components; and
an output module arranged to output the set of polynomial components;
and the system further comprising a design tool arranged to generate an implementation of the one or more polynomials comprising a plurality of interconnected hardware logic elements, each of the hardware logic elements arranged to correctly evaluate one of the polynomial components using the rounded arithmetic and the plurality of hardware logic elements comprising at least one hardware logic element corresponding to each of the polynomial components.

17. A system according to claim 16, wherein the assessment module is arranged to reduce the set of input polynomials to a smaller set of polynomial components from which all the set of input polynomials can be evaluated accurately by:

(i) removing a polynomial q from the set of input polynomials;
(ii) determining if there is any variable assignment for which a function F is equal to zero, where:

$$F(x_1, \ldots, x_m, y_1, \ldots, y_r) = \prod_{p_z} (p_z(x) - q(y))$$

where $p_z$ is the union of the set of input polynomials and the set of polynomial components;
(iii) in response to determining that there is no variable assignment for which a function F is equal to zero, adding the polynomial q to the set of polynomial components and in response to determining that there is a variable assignment for which a function F is equal to zero, not adding the polynomial q to the set of polynomial components; and
repeating (i)-(iii) until all polynomials have been removed from the set of input polynomials.

18. The system according to claim 16, further comprising:
an integrated circuit manufacturing system arranged to fabricate an integrated circuit comprising the implementation of the one or more polynomials.

19. The system according to claim 16, further comprising:
a polynomial evaluation module arranged to generate the set of input polynomials from the one or more polynomials.

20. A non-transitory computer readable storage medium having stored thereon an integrated circuit definition dataset that, when processed in an integrated circuit manufacturing system, configures the integrated circuit manufacturing system to manufacture an integrated circuit comprising an implementation of one or more polynomials using rounded arithmetic, wherein the implementation is generated by:

receiving, in an input module, a set of input polynomials generated from the one or more polynomials;

reducing, in an assessment module, the set of input polynomials to a smaller set of polynomial components from which all the set of input polynomials can be evaluated accurately, by only adding those polynomials from the input set of polynomials which cannot be evaluated using other polynomials in the set of input polynomials or set of polynomial components to the set of polynomial components; and generating an implementation of the one or more polynomials comprising a plurality of interconnected hardware logic elements, each of the hardware logic elements arranged to correctly evaluate one of the polynomial components using the rounded arithmetic and the plurality of hardware logic elements comprising at least one hardware logic element corresponding to each of the polynomial components.

* * * * *